United States Patent [19]
Phelps

[11] Patent Number: 5,163,226
[45] Date of Patent: Nov. 17, 1992

[54] METHOD FOR FORMING A BANJO-TYPE AXLE HOUSING

[75] Inventor: Orville E. Phelps, Toledo, Ohio

[73] Assignee: Dana Corporation, Toledo, Ohio

[21] Appl. No.: 731,737

[22] Filed: Jul. 16, 1991

[51] Int. Cl.$^5$ ...................... B21D 39/02; B20B 35/00
[52] U.S. Cl. .................................................. 29/897.2
[58] Field of Search ................ 29/897.2, 463, 525.1, 29/407; 74/650; 301/1, 124 H

[56] References Cited

U.S. PATENT DOCUMENTS

| | | |
|---|---|---|
| 1,895,589 | 1/1933 | Spatta . |
| 1,912,600 | 6/1933 | Spatta . |
| 1,926,353 | 9/1933 | Spatta . |
| 1,945,076 | 1/1934 | Riemenschneider . |
| 1,945,077 | 1/1934 | Riemenschneider . |
| 1,945,078 | 1/1934 | Riemenschneider . |
| 1,945,079 | 1/1934 | Riemenschneider . |
| 1,945,080 | 1/1934 | Thoms . |
| 1,958,215 | 5/1934 | Spatta . |
| 1,962,944 | 6/1934 | Spatta . |
| 1,978,685 | 10/1934 | Mogford et al. . |
| 2,124,406 | 7/1938 | Spatta . |
| 2,153,287 | 4/1939 | Wallace et al. . |
| 2,188,316 | 1/1940 | Schirmer . |
| 2,625,055 | 1/1953 | Cudy . |
| 3,269,214 | 8/1966 | Nagel . |
| 3,690,399 | 9/1972 | Bokovoy et al. . |
| 4,545,452 | 10/1985 | Moring et al. .................. 29/897.2 X |

*Primary Examiner*—Timothy V. Eley
*Attorney, Agent, or Firm*—MacMillan, Sobanski & Todd

[57] ABSTRACT

Two embodiments of a method for forming a banjo type axle housing are disclosed. Initially, one end of a tube is split into upper and lower sides by forming a pair of opposed longitudinally extending slots therein. The sides are spread apart from one another to form a yoke-like end portion. A second tube is formed in a similar manner. The two tubes are then positioned end-to-end such that the end portions abut one another. Next, the abutting end portions of the tubes are welded together to form the basic housing structure. Preferably, the upper and lower sides of such end portions are slightly spread apart from one another to introduce desirable surface compressive stresses in the welded housing. A mounting plate is then secured to the axle housing on opposite sides of the opening. The mounting plate is provided with a generally oval shaped opening. Flanges are then secured to or formed integrally with the ends of the axle housing. The flanges are used for precisely locating apertures which are next formed through the mounting plate. Such apertures are provided for mounting a carrier for the axle assembly onto the banjo type axle housing. Alternatively, the apertures can be pre-formed through the mounting plate. In this event, the mounting plate is precisely positioned relative to the banjo type axle housing by means of the flanges before being secured thereto. In both embodiments, the apertures formed through the mounting plate are precisely positioned relative to the flanges at the ends of the tubes.

20 Claims, 4 Drawing Sheets

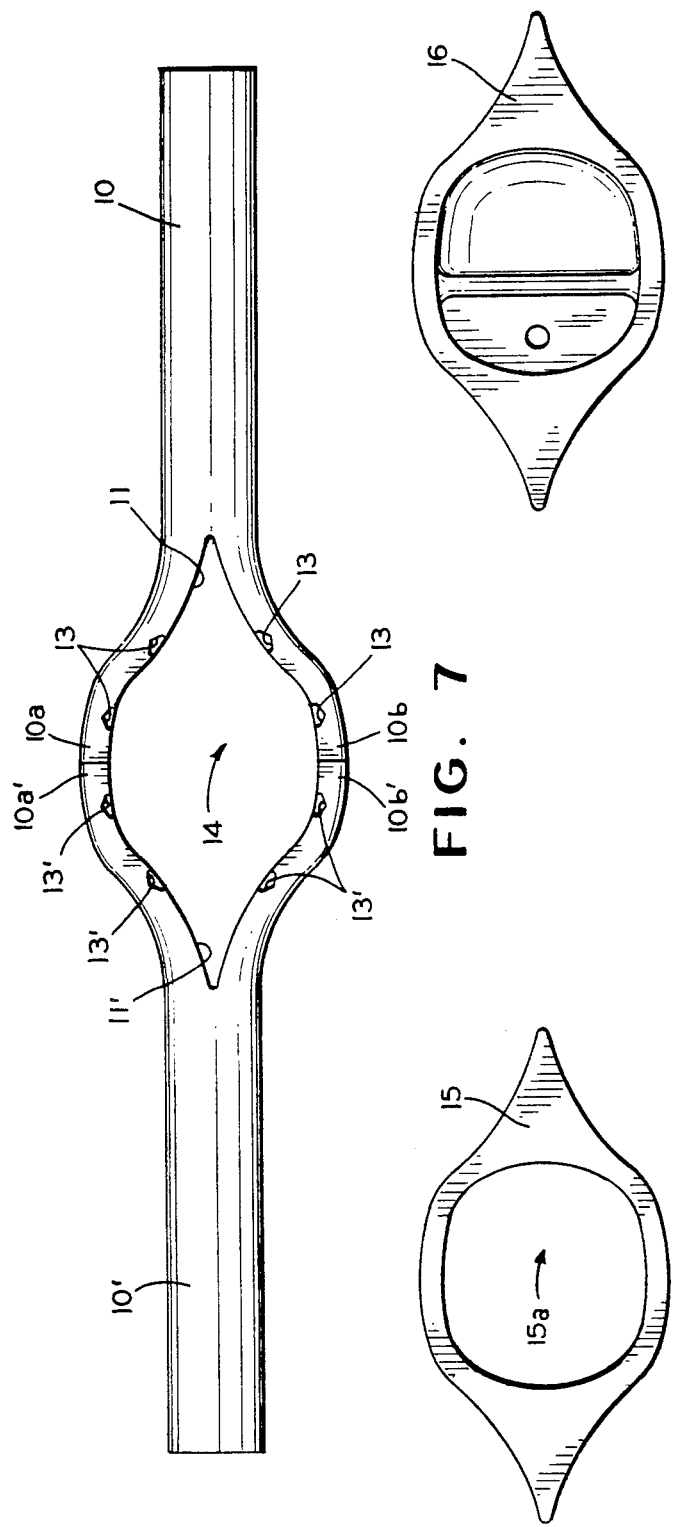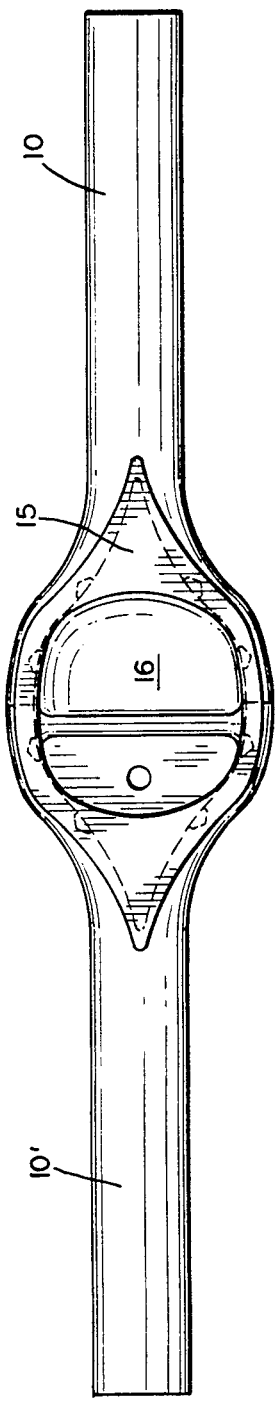

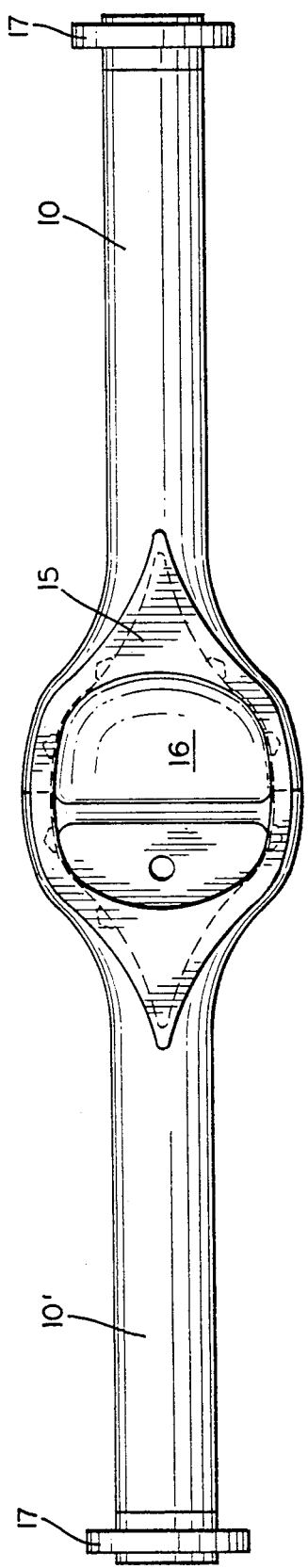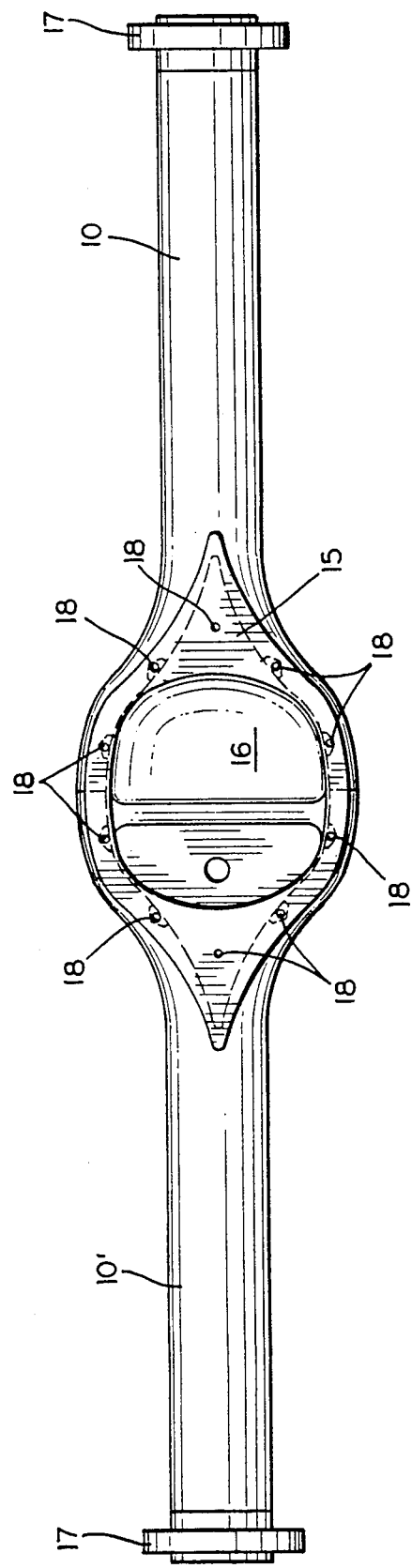

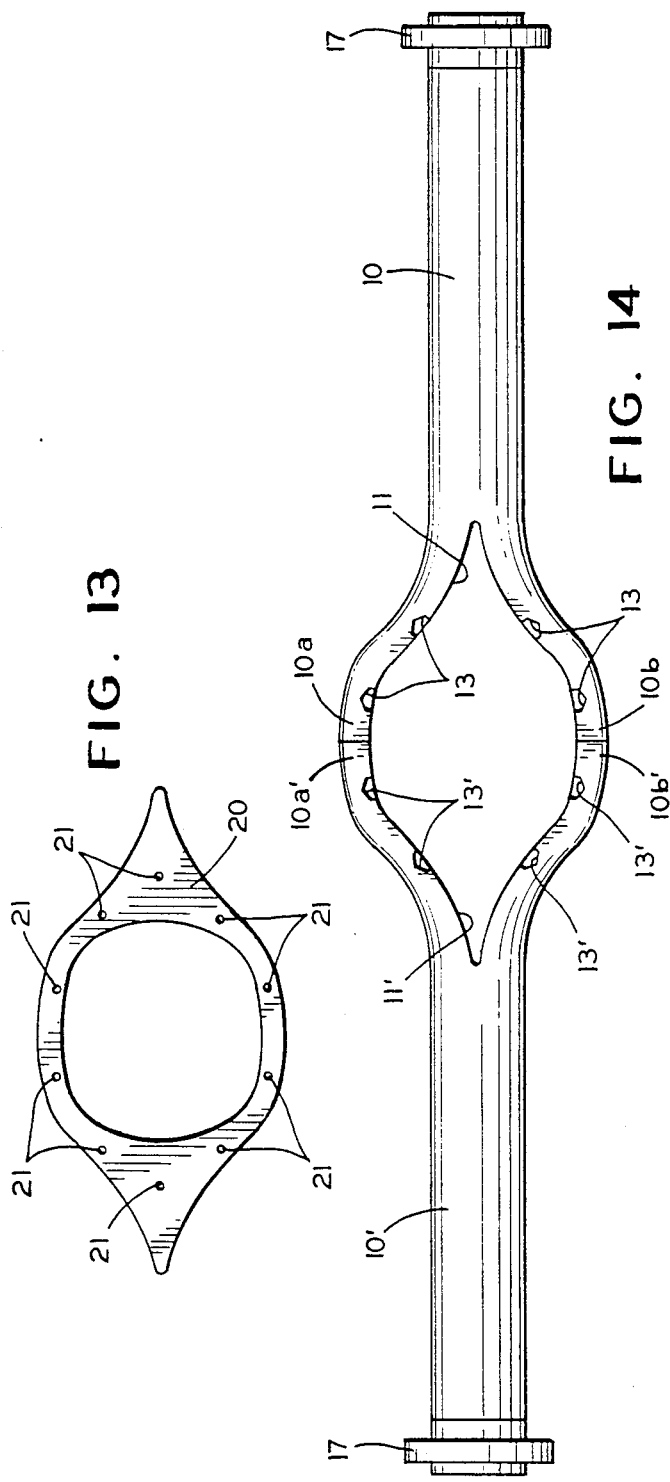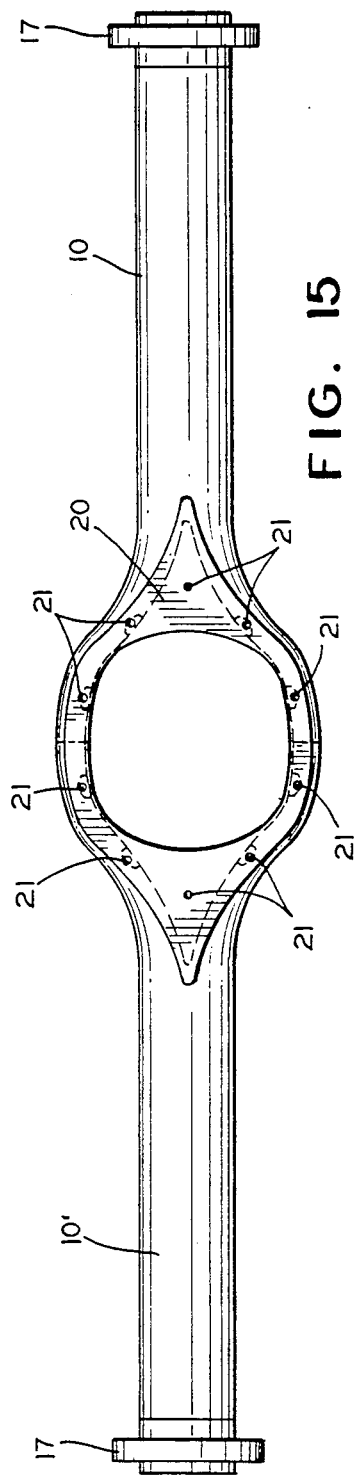

METHOD FOR FORMING A BANJO-TYPE AXLE HOUSING

BACKGROUND OF THE INVENTION

This invention relates in general to vehicle axle assemblies and in particular to an improved method for forming a banjo-type housing for such an axle assembly.

Axle assemblies are well known structures which are in common use in most vehicles. Such axle assemblies include a number of components which are adapted to transmit rotational power from an engine of the vehicle to the wheels thereof. Typically, an axle assembly includes a differential which is rotatably supported within a non-rotating carrier. The differential is connected between an input drive shaft extending from the vehicle engine and a pair of output axle shafts extending to the vehicle wheels. The axle shafts are contained in respective non-rotating tubes which are secured to the carrier. Thus, rotation of the differential by the drive shaft causes corresponding rotation of the axle shafts. The carrier and the tubes form a housing for these drive train components of the axle assembly, inasmuch as the differential and the axle shafts are supported for rotation therein.

Axle housings are generally classified into two basic types. The first axle housing type is a unitized carrier construction, commonly referred to as a Salisbury or Spicer type axle assembly. In this structure, the carrier (which houses the rotatable differential) is directly connected to the two tubes (which house the rotatable axle shafts). An opening is provided at the rear of the carrier to permit assembly of the differential therein. This opening is closed by a cover during use. Unitized carrier axle housing constructions of this type are economical to manufacture and are readily adaptable for a variety of vehicles.

The second axle housing type is a separable carrier construction. In this structure, the axle tubes are connected together by a central member which is formed separate and apart from the carrier. This central member is generally hollow and cylindrical in shape, having a large generally circular opening formed therethrough. During assembly, the differential is first assembled within the carrier, then the carrier is secured to the central member. The overall shape of this type of axle housing (i.e., the generally round shape of the central member and the elongated tubes extending therefrom) generally resembles the shape of a banjo musical instrument. Hence, this type of axle housing is commonly referred to as a banjo type axle housing. Banjo type axle housings are advantageous because the carrier and differential can be removed from the axle assembly for service without disturbing the other components thereof.

In the past, several methods have been employed to form banjo type axle housings. A first known method involved forming the hollow cylindrical central member and the two tubes as three separate pieces. The tubes were then secured to the central member by welding or other means to form the housing. A second known method involved forming the entire housing from a single tubular blank. A hole was cut through the center of the blank, then formed into the hollow cylindrical central member, while the opposed end portions of the blank extended outwardly therefrom to form the tubes. A third known method involved forming the central member integrally from the ends of the two tubes. This was accomplished by splitting one end of each of the two tubes, spreading the two split ends apart, and securing the two spread ends together to form the hollow cylindrical central member.

Following the construction of the banjo type axle housing by any of these methods, flanges are formed or otherwise secured to the outer ends of the tubes. These flanges provide mounting surfaces for brakes and other components of the wheel ends to be mounted onto the axle assembly. Thus, it will be appreciated that the positions of the flanges relative to one another and relative to the other components of the axle assembly (such as the carrier, the differential, and the axle shafts) is important. Improper alignment of these components can cause vibration, noise, and premature wear.

While the above-described known methods have been used successfully to form banjo type axle housings, it has been found that all require numerous manufacturing steps to insure that the various components of the axle assembly are properly positioned relative to one another. Thus, it would be desirable to provide an improved method for forming a banjo type axle housing which does not require as many steps as are performed in known methods, thus reducing the time and cost of manufacture.

SUMMARY OF THE INVENTION

This invention relates to two embodiments of an improved method for forming a banjo type axle housing for use in a vehicle axle assembly. Initially, one end of a tube is split into upper and lower sides by forming a pair of opposed longitudinally extending slots therein. The sides are spread apart from one another to form a yoke-like end portion. A second tube is formed in a similar manner. The two tubes are then are positioned in end-to-end relationship such that the yoke-like end portions abut one another. Next, the abutting end portions of the tubes are welded together to form the basic banjo type axle housing having a central opening formed therethrough. Preferably, the upper and lower sides of such end portions are slightly spread apart from one another to introduce desirable surface compressive stresses in the welded housing. A mounting plate and a rear cover are then secured to the axle housing on opposite sides of the opening. The mounting plate is provided with a generally oval shaped opening. Flanges are then secured to or formed integrally with the ends of the axle housing. The flanges are used for precisely locating apertures which are next formed through the mounting plate. Such apertures are provided for mounting a carrier for the axle assembly onto the banjo type axle housing. Alternatively, the apertures can be pre-formed through the mounting plate. In this event, the mounting plate is precisely positioned relative to the banjo type axle housing by means of the flanges before being secured thereto. Thus, in both embodiments, the apertures formed through the mounting plate are precisely positioned relative to the flanges at the ends of the tubes. As previously mentioned, it is important that the flanges be precisely positioned relative to the carrier, the differential, and the axle shafts (the positions of which are all determined by the apertures formed through the mounting plate) to avoid vibration, noise, and premature wear in the axle assembly.

Various objects and advantages of this invention will become apparent to those skilled in the art from the following detailed description of the preferred embodi-

BRIEF DESCRIPTION OF THE DRAWINGS

FIG. 7 is a side elevation view of two identically formed tubes oriented in end-to-end fashion to form the basic structure of the banjo type axle housing.

FIG. 8 is a side elevational view of a mounting plate adapted to be secured about the forwardly facing side of the opening formed through the banjo type axle housing shown in FIG. 7.

FIG. 9 is a side elevational view of a cover plate adapted to be secured about the rearwardly facing side of the opening formed through the banjo type axle housing shown in FIG. 7.

FIG. 10 is a side elevational view of the banjo type axle housing showing the mounting plate of FIG. 8 and the cover plate of FIG. 9 secured thereto.

FIG. 11 is a side elevational view similar to FIG. 10 showing brake flanges secured to the ends of the tubes.

FIG. 12 is a side elevational view similar to FIG. 11 showing a plurality of apertures formed through the mounting plate.

FIG. 13 is a side elevational view of an alternate embodiment of a mounting plate adapted to be secured about the forwardly facing side of the opening formed through the banjo type axle housing shown in FIG. 7.

FIG. 14 is a side elevational view similar to FIG. 7 of the banjo type axle housing showing brake flanges already secured to the ends of the tubes.

FIG. 15 is a side elevational view similar to FIG. 14 showing the alternate embodiment of the mounting plate of FIG. 13 secured thereto.

DETAILED DESCRIPTION OF THE PREFERRED EMBODIMENTS

Figure 2:
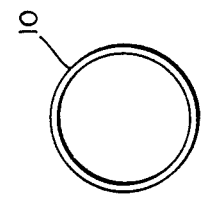
FIG. 2 is an end elevational view of the tube shown in FIG. 1 taken along line 2—2.
Figure 4:
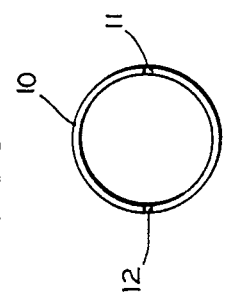
FIG. 4 is an end elevational view of the tube shown in FIG. 3 taken along line 4—4.
Figure 1:
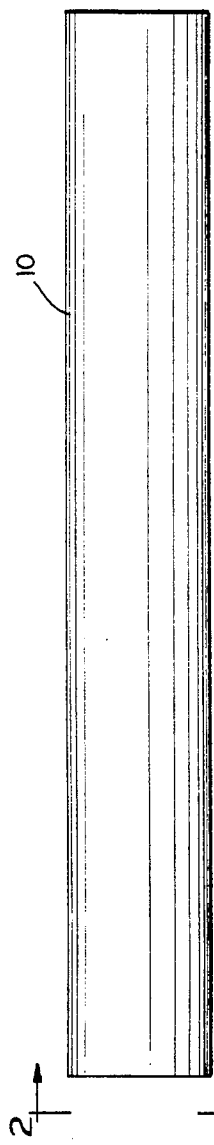
FIG. 1 is a side elevational view of a tube used to form a portion of a banjo type axle housing in accordance with the method of this invention.
Figure 3:
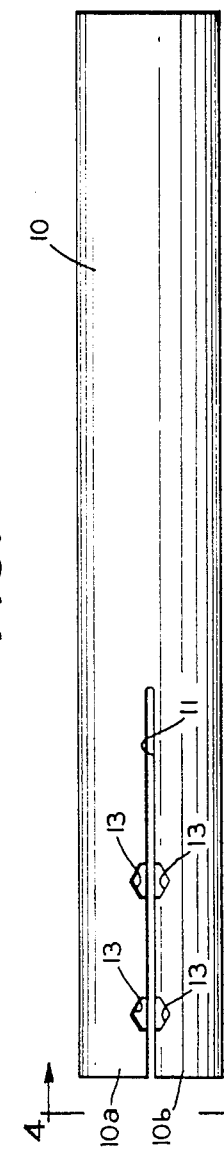
FIG. 3 is a side elevation view of the tube shown in FIG. 1 showing a pair of opposed longitudinal slots formed in one end thereof to define upper and lower sides.

Referring now to the drawings, there is illustrated in FIGS. 1 through 12 a first embodiment of a method for forming a banjo type axle housing in accordance with this invention. Initially, as shown in FIGS. 1 and 2, a hollow cylindrical tube 10 is provided. The tube 10 is formed out of a suitable material, such as steel, and is preferably of a seamless construction. Next, as shown in FIGS. 3 and 4, a pair of opposed longitudinally extending slots 11 and 12 are formed in one end of the tube 10. The slots 11 and 12 divide the end of the tube 10 into upper and lower sides 10a and 10b. The slots 11 and 12 may be formed by blanking, sawing, or any other known method. The length of the slots 12 will vary with the size of the banjo type axle housing to be formed. For convenience, the slot 11 will be referred to as being formed on the forwardly facing side of the tube 10, while the slot 12 will be referred to as being formed on the rearwardly facing side of the tube 10.

Next, one or more notches 13 are formed in the edges of the upper and lower sides 10a and 10b of the tube 10 on either side of the forwardly facing slot 11, as also shown in FIGS. 3 and 4. The notches 13 are preferably non-circular in shape and may be formed by blanking. No such notches 13 need be formed on the upper and lower sides 10a and 10b of the tube 10 on either side of the rearwardly facing slot 12. As will be explained in detail below, the notches 13 are provided in the tube 10 for facilitating the assembly of the other components of the axle assembly of the banjo type axle housing.

Figure 6:
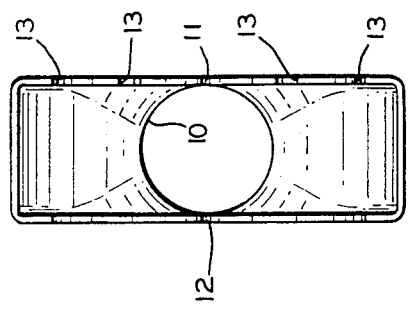
FIG. 6 is an end elevational view of the tube shown in FIG. 5 taken along line 6—6.
Figure 5:
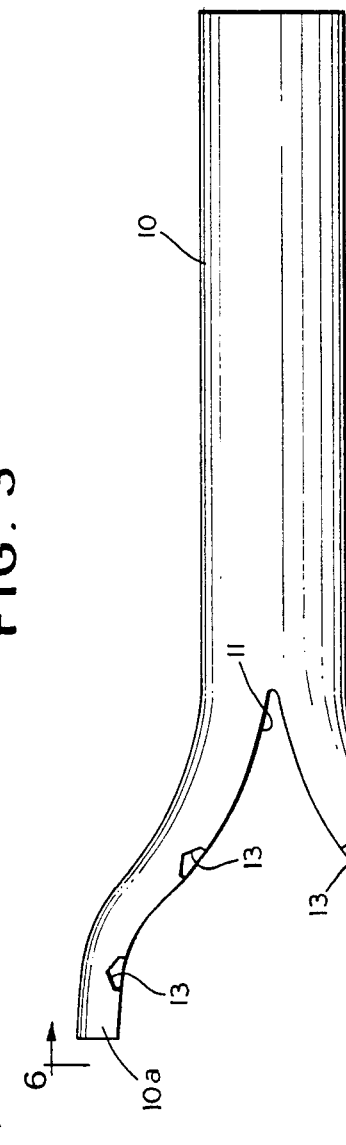
FIG. 5 is a side elevation view of the tube shown in FIG. 3 showing the upper and lower sides spread apart from one another to form a yoke-like end portion for the tube.

As shown in FIGS. 5 and 6, the upper and lower sides 10a and 10b of the end of the tube 10 are then spread apart from one another to form a yoke-like end portion for the tube 10. At the same time, the upper and lower sides 10a and 10b are formed out of their generally semi-circular shapes (best illustrated in FIGS. 2 and 4) into generally semi-rectangular shapes (best illustrated in FIG. 6). This forming can be accomplished by conventional hot, warm, or cold forming methods. The formed tube 10 shown in FIGS. 5 and 6 constitutes one half of the banjo type axle housing. The other half of the banjo type axle housing is created by repeating the above-described process so as to provide a second formed tube 10' (see FIG. 7). The second formed tube 10' is preferably identical in shape to the first formed tube 10' including split upper and lower sides 10a' and 10b' defined by slots 11' and 12' and including notches 13'. However, the two tubes 10 and 10' need not be formed having identical shapes.

The next step in the process is to connect the two formed tubes 10 and 10' together to form the basic banjo type axle housing. To accomplish this, the two formed tubes 10 and 10' are oriented in end-to-end fashion, as shown in FIG. 7. As a result, the inner yoke-like end portions are disposed adjacent to one another, and the outer cylindrical tube ends are co-axially aligned. A conventional fixture can be employed to orient and maintain the formed tubes 10 and 10' in this position.

The two formed tubes 10 and 10' are then welded together along the abutting edges of the upper sides 10a and 10a' and the lower sides 10b and 10b'. Preferably, the upper sides 10a and 10a' and the lower sides 10b and 10b' are slightly spread apart from one another, respectively, before being welded together. Such spreading introduces desirable compressive stresses in the curved outer surfaces of such sides 10a, 10a', 10b, and 10b'. These surface compressive stresses increase the strength of the overall housing when the two formed tubes 10 and 10' are welded together. This forms the basic structure for the banjo type axle housing, including a central member having a generally oval-shaped opening, indicated generally at 14, formed therethrough and two cylindrical tubes 10 and 10' extending co-axially outwardly therefrom. For convenience, the opening 14 will be referred to as extending from the forwardly facing sides of the tubes 10 and 10' to the rearwardly facing sides thereof.

The next steps in the process are to secure a mounting plate 15 (shown in FIG. 8) about the forwardly facing side of the opening 14 and a cover plate 16 (shown in FIG. 9) over the rearwardly facing side of the opening 14. Both the mounting plate 15 and the cover plate 16 can be formed from the same material as the tubes 10 and 10' and are secured thereto by any conventional means, such as by welding. The mounting plate 15 is generally flat, having a large generally oval shaped opening 15a formed therethrough. As shown in FIG. 10, the mounting plate 15 is disposed such that a portion of it extends over the notches 13 formed in the upper and lower sides 10a and 10b of the fronts of the tubes 10 and 10′. For reasons which will become apparent below, the mounting plate 15 need not be precisely positioned relative to the tubes 10 and 10′ when being secured thereto. When secured about the forwardly facing side of the opening 14, the mounting plate 15 provides a surface for mounting the carrier and remaining components of the axle assembly thereto, as will be explained below.

The cover plate 16 is shaped to accommodate the various components of the differential and other components of the axle assembly to be installed therein. When secured over the rearwardly facing side of the opening 14, the cover plate 16 provides a protective cover for such components. Because it functions solely to protect the enclosed components and not to provide any type of mounting surface, the cover plate 16 also need not be precisely positioned relative to the tubes 10 and 10′ when being secured thereto.

The next step in the process is to provide flanges, indicated generally at 17, in FIG. 11 on the opposed ends of the tubes 10 and 10′. The flanges 17 provide mounting surfaces for brakes (not shown) and other components of the wheel ends to be assembled onto the axle assembly. Thus, the positions of the flanges 17 relative to one another and relative to the other rotatable components of the axle assembly are important. As shown in FIG. 11, the brake flanges 17 may be formed as separate pieces which are pressed into the ends of the tubes 10 and 10′ and secured thereto, such as by welding. Alternatively, the brake flanges 17 may be formed integrally with the tubes 10 and 10′ by conventional processes, such as by upsetting. In either event, the flanges 17 are secured to opposed ends of the tubes 10 and 10′.

As mentioned above, it is important that the flanges 17 be precisely positioned relative to the other rotatable components of the axle assembly, particularly the differential and the axle shafts. To accomplish this, a plurality of apertures 18 are formed through the mounting plate 15. The locations of these apertures 18 are determined by reference to the positions of the flanges 17, as shown in FIG. 12. This can be accomplished by supporting the flanges 17 on a fixture and drilling the apertures 18 at predetermined locations relative to the fixed positions of the flanges 17. The apertures 18 are provided to receive bolts (not shown) or similar means for mounting the carrier on the mounting plate 15 and, thus, to the axle assembly. Thus, by locating the apertures 18 precisely relative to the flanges 17, it is assured that the carrier is precisely located relative to the flanges 17 and the wheel ends of the axle assembly when secured to the mounting plate 15. As a result, the differential rotatably supported in the carrier and other drive train components are properly positioned within the axle assembly.

To secure the carrier to the mounting plate 15, the bolts are inserted through the apertures 18 from behind the mounting plate 15, extending forwardly. Thus, the heads of the bolts are received in the notches 13 and 13′ formed in the tubes 10 and 10′, respectively. As mentioned above, the notches 13 and 13′ are formed in non-circular shapes, preferably the same non-circular shapes as the heads of the bolts. Thus, the notches 13 and 13′ engage the heads of the bolts to prevent rotation thereof when the carrier is secured to the mounting plate 15. While it is important that the positions of the apertures 18 be precisely located relative to the flanges 17, it is not required that the notches 13 and 13′ be so precisely positioned. Once the carrier is secured to the mounting plate 15, the cover plate 16 can be secured to tubes 10 and 10′ so as to close the rearwardly facing side of the opening 14.

Because the carrier rotatably supports the differential of the axle assembly therein, and further because the differential rotatably supports the inner ends of the axle shafts extending outwardly through the tubes 10 and 10′, it will be appreciated that the positions of the apertures 18 determine the relative positions of the inner ends of the axle shafts within the axle assembly. The apertures 18 can, therefore, be used for precisely locating the positions of axially extending bores (not shown) formed through the flanges 17 at the ends of the tubes 10 and 10′. Such bores are provided for receiving wheel bearings therein, which define the positions of the outer ends of the axle shafts within the axle assembly. Thus, it can be seen that all of the drive shaft components of the axle assembly are quickly and easily positioned relative to one another by reference to the flanges 17 and the apertures 18.

Thus, it can be seen that the resultant banjo type axle housing structure is formed such that the apertures 18 formed through the mounting plate 15 are precisely located relative to the flanges 17. Consequently, the differential and the axle shafts of the axle assembly are precisely positioned relative to the brakes and other components of the wheel ends to be assembled onto the axle assembly. Although the process for forming the axle assembly described above contemplates that the flanges 17 be secured to the ends of the tubes 10 and 10′ immediately before the mounting plate 15 is secured thereto, it will be appreciated that such flanges 17 may be secured to or formed on the ends of the tubes 10 and 10′ at virtually any prior step in the process. For example, the flanges 17 may be secured to the ends of the tubes 10 and 10′ immediately after such tubes 10 and 10′ have been welded together, as shown in FIG. 7. The important feature of the method is that the flanges 17 be secured prior to the formation of the apertures 18, since the locations of such apertures 18 are determined by reference to the positions of the flanges 17.

As mentioned above, the opening 15a formed through the mounting plate 15 is generally oval-shaped. This is preferable to the generally circular shape of prior openings. As is well known, the drive shaft components of the axle assembly are subjected to torque forces during use. Such torque forces undesirably tend to rotate the differential and the carrier relative to the axle housing. The oval shaped opening 15a is effective for providing a positive stop against such relative rotation. To accomplish this, the internal components of the differential (the bearing caps for the axle shafts, for example) are positioned so as to be located within the major axis portion of the opening 15a formed through the mounting plate 15. If a sufficiently large torque force is encountered, the bearing caps will engage the minor axis sides of the opening to prevent relative rotation.

Referring now to FIGS. 13 through 15, there is illustrated an alternate embodiment of a method for forming a banjo type axle housing. The steps of the method described above with respect to FIGS. 1 through 7 are initially performed, as described above. FIG. 13 illustrates a mounting plate 20 which is adapted to be secured about the forwardly facing side of the opening 14 formed through the banjo type axle housing shown in FIG. 7. Unlike the previously described mounting plate 15, the alternate mounting plate 20 has a plurality of apertures 21 pre-formed therethrough. These pre-formed apertures 21 serve the same function as the previously described apertures 18 formed through the mounting plate 15.

Since the apertures 21 are pre-formed through the mounting plate 20, the mounting plate 20 must be precisely positioned relative to the flanges 17 formed on the tubes 10 and 10'. Thus, as shown in FIG. 14, the flanges 17 must be secured to or formed on the tubes 10 and 10' before the mounting plate 20 is secured thereto. As a result, the apertures 21 formed through the mounting plate 20 are precisely positioned relative to the flanges 17 when the mounting plate 20 is secured to the tubes 10 and 10', as shown in FIG. 15.

In accordance with the provisions of the patent statutes, the principle and mode of operation of this invention have been described and illustrated in its preferred embodiment. However, it will be understood that this invention may be practiced otherwise than as specifically explained and illustrated without departing from the spirit and scope of the following claims.

What is claimed is:

1. A method for forming a banjo-type axle housing comprising the steps of:
   (a) providing a pair of tubes, each having a pair of yoke-like split end portions;
   (b) positioning the split end portions of the tubes in abutting relationship;
   (c) spreading the split end portions of the tubes slightly apart from one another so as to introduce surface compressive stresses therein; and
   (d) securing the split end portions of the tubes together while maintaining said slightly spread apart relationship to form the axle housing.

2. The invention defined in claim 1 wherein said step (a) is performed by forming slots in the ends of the tubes to define upper and lower sides and spreading the upper and lower sides apart from one another to define the yoke-like split end portions.

3. A method for forming a banjo-type axle housing comprising the steps of:
   (a) providing a housing including a central member having an opening formed therethrough and a pair of tubes extending from the central member;
   (b) securing a mounting plate to the housing;
   (c) providing a flange on the end of one of the tubes; and
   (d) forming an aperture through the mounting plate at a location which is determined by reference to the position of the flange provided at the end of one of the tubes.

4. The invention defined in claim 3 wherein said step (a) is performed by providing a pair of tubes, each having a pair of split end portions; positioning the split end portions of the tubes in abutting relationship; spreading the split end portions of the tubes slightly apart from one another so as to introduce surface compressive stresses therein; and securing the split end portions of the tubes together while maintaining said slightly spread apart relationship to form the axle housing.

5. The invention defined in claim 4 wherein said step of providing a pair of tubes, each having a pair of split end portions, is performed by forming slots in the ends of the tubes to define upper and lower sides and spreading the upper and lower sides apart from one another to define the yoke-like split end portions.

6. The invention defined in claim 5 wherein a notch is formed in one of the slots formed in the end of one of the tubes.

7. The invention defined in claim 3 wherein the mounting plate has a central opening formed therethrough, and wherein the mounting plate is positioned such that the mounting plate opening extends over the central member opening.

8. The invention defined in claim 3 wherein said step (b) is performed by welding the mounting plate to the housing.

9. The invention defined in claim 3 wherein said step (c) is performed by securing a flange on the end of one of the tubes.

10. The invention defined in claim 3 wherein said step (c) is performed by forming a flange integrally with the ends of one of the tubes.

11. The invention defined in claim 3 wherein said step (d) is performed by forming a plurality of apertures through the mounting plate at locations which are determined by reference to the position of one of the flanges provided at the end of one of the tubes.

12. A method for forming a banjo-type axle housing comprising the steps of:
   (a) providing a housing including a central member having an opening formed therethrough and a pair of tubes extending from the central member;
   (b) providing a flange on the end of one of the tubes;
   (c) providing a mounting plate having an aperture formed therethrough; and
   (d) securing the mounting plate to the housing such that the aperture is positioned at a location which is determined by reference to the position of the flange provided at the end of one of the tubes.

13. The invention defined in claim 12 wherein said step (a) is performed by providing a pair of tubes, each having a pair of split end portions; positioning the split end portions of the tubes in abutting relationship; spreading the split end portions of the tubes slightly apart from one another so as to introduce surface compressive stresses therein; and securing the split end portions of the tubes together while maintaining said slightly spread apart relationship to form the axle housing.

14. The invention defined in claim 13 wherein said step of providing a pair of tubes, each having a pair of split end portions, is performed by forming slots in the ends of the tubes to define upper and lower sides and spreading the upper and lower sides apart from one another to define the yoke-like split end portions.

15. The invention defined in claim 14 wherein a notch is formed in one of the slots formed in the end of one of the tubes.

16. The invention defined in claim 12 wherein the mounting plate has a central opening formed therethrough, and wherein the mounting plate is positioned such that the mounting plate opening extends over the central member opening.

17. The invention defined in claim 12 wherein said step (b) is performed by welding the mounting plate to the housing.

18. The invention defined in claim 12 wherein said step (c) is performed by securing a flange on the end of one of the tubes.

19. The invention defined in claim 12 wherein said step (c) is performed by forming a flange integrally with the ends of one of the tubes.

20. The invention defined in claim 12 wherein said step (d) is performed by forming a plurality of apertures through the mounting plate at locations which are determined by reference to the position of one of the flanges provided at the end of one of the tubes.

* * * * *